(No Model.)

S. B. PARKER.
POTATO DIGGER.

No. 249,664. Patented Nov. 15, 1881.

WITNESSES:
Donn P. Twitchell.
C. Sedgwick

INVENTOR:
S. B. Parker
BY Munn & Co.
ATTORNEYS.

UNITED STATES PATENT OFFICE.

SHELDON B. PARKER, OF GROTON, NEW YORK.

POTATO-DIGGER.

SPECIFICATION forming part of Letters Patent No. 249,664, dated November 15, 1881.

Application filed April 14, 1881. (No model.)

*To all whom it may concern:*

Be it known that I, SHELDON B. PARKER, of Groton, Tompkins county, New York, have invented a new and useful Improvement in Potato-Diggers, of which the following is a specification.

Figure 1:
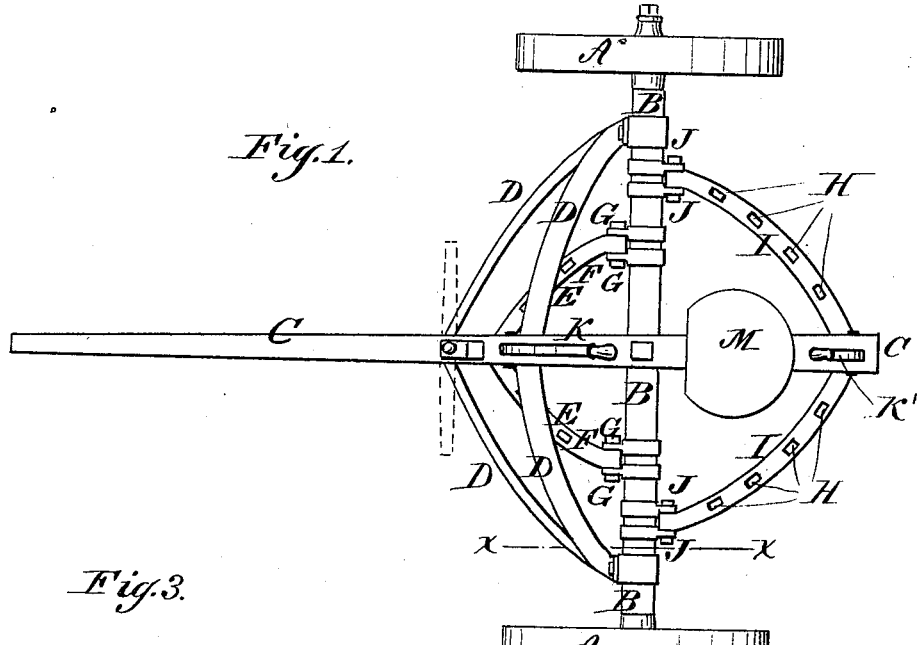
Figure 3:
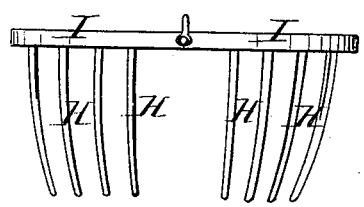
Figure 2:
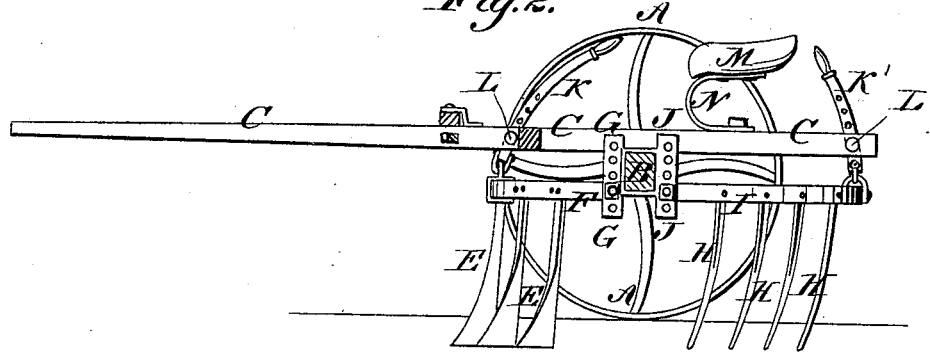
Figure 4:

Figure 1 is a plan view of my improvement. Fig. 2 is a sectional side elevation of the same, taken through the line $x\,x$, Fig. 1. Fig. 3 is a rear elevation of the gatherer, and Fig. 4 is a plan view of one of the digger-teeth.

Similar letters of reference indicate corresponding parts.

The object of this invention is to facilitate the digging and gathering of potatoes.

The invention consists in constructing a potato-digger of a carriage, a curved or angular bar provided with digging-teeth and hinged at its ends adjustably to plates attached to the axle, the curved or angular bar provided with gathering-teeth and hinged at its ends adjustably to the axle, and the two levers for regulating the pitch of the teeth, whereby the potatoes and the soil in which they are embedded are raised and the potatoes are separated from the soil and collected along the center of the row, as will be hereinafter fully described.

A represents the wheels, to the axle B of which is rigidly attached the tongue C. The tongue C is strengthened against lateral strain by braces or hounds D.

The digger-teeth E are attached to a curved or angular bar, F, the ends of which are hinged to and between upright plates G, clamped or otherwise secured to the axle B. Several holes are formed in the hinging-plates G, to receive the hinging-bolt, so that the bar F can be raised and lowered to adjust the teeth E to work shallower or deeper in the ground, as may be required.

H are the gathering or rake teeth, which are attached to the curved or angular bar I. The bar I is made longer than the bar F, and its ends are hinged to and between the pairs of upright plates J, clamped or otherwise secured to the axle B. Several holes are formed in the hinging-plates J, to receive the hinging-bolts, so that the gathering-teeth H can be adjusted higher or lower, to correspond with the adjustment of the digging-teeth E.

To the centers of the bars F I are secured, by clevises or other suitable means, the lower ends of two levers, K K', which pass through slots in the tongue C, and are secured to the said tongue by pins or bolts L, so that the pitch of the teeth E H can be adjusted as circumstances may require.

M is the driver's seat, the spring-support N of which is attached to the tongue C or to the axle B, as may be desired.

With this construction, as the machine is drawn forward the digging-teeth E raise the potatoes and the soil in which they are embedded, and move them from the center toward the sides of the row, and the teeth H separate the potatoes from the soil and gather the potatoes toward the center of the row, out of the way of the machine at its passage along the next row, and in a convenient position for being picked.

Having thus described my invention, I claim as new and desire to secure by Letters Patent—

1. A potato-digger constructed substantially as herein shown and described, consisting of the carriage A B C, the digger E F, the gatherer H I, the hinging-plates G J, and the adjusting-levers K K', as set forth.

2. In a potato-digger, the combination, with the carriage A B C and the digger E F, of the gathering-teeth H, the hinged bar I, and the lever K', substantially as herein shown and described, whereby the potatoes are separated from the soil and gathered along the center of the row, as set forth.

SHELDON BURR PARKER.

Witnesses:
EZRA BOSTWICK,
WARREN KYES.